INVENTOR
JACK M. WOMACK

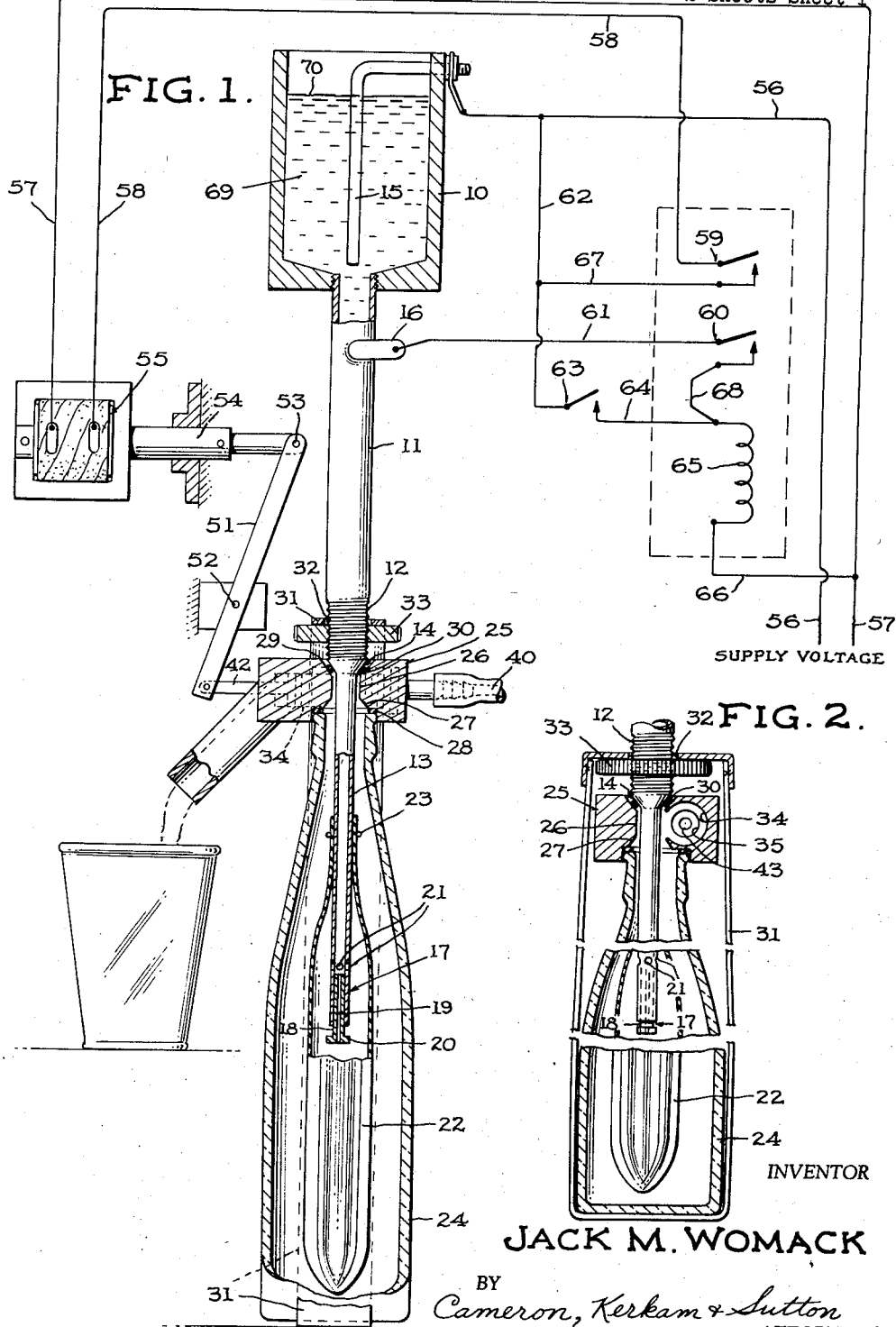

United States Patent Office 2,944,703
Patented July 12, 1960

2,944,703
CARBONATED BEVERAGE DISPENSER

Jack M. Womack, Chattanooga, Tenn., assignor to Cavalier Corporation, Chattanooga, Tenn., a corporation of Tennessee Filed July 24, 1958, Ser. No. 750,641

5 Claims. (Cl. 222—76)

This invention relates to dispensing apparatus for dispensing carbonated fluids without undue separation of the gas in which a predetermined quantity of the carbonated liquid is dispensed from a pressurized container holding the carbonated liquid saturated with absorbed gas and in which the liquid is dispensed to a container under reduced pressure so that the carbonated liquid becomes supersaturated.

Even more particularly this invention relates to apparatus for dispensing measured amounts of pre-mix carbonated beverages, it being understood that "pre-mix carbonated beverages," hereinafter called "pre-mix" for convenience, means carbonated beverages in which the carbonated water and other ingredients including syrup have been mixed in a pressurized container prior to dispensing at the sales location.

It is well known that pre-mix can be transferred or handled in almost any manner in a closed system if the pressure on the pre-mix is maintained at or above the saturation pressure for given conditions of carbonation and temperature. If the pressure drops below the theoretical saturation pressure, the pre-mix is sensitive to flow turbulence, mechanical shock waves and the like and will foam at the slightest provocation.

Because of these characteristics of pre-mix, apparatus heretofore proposed for dispensing measured amounts of pre-mix maintain enough pressure in the metering chamber to hold the carbon dioxide gas in solution. When the pre-mix is transferred from the metering chamber to the cup this pressure must be relieved and the pre-mix is allowed to flow through a comparatively large opening into the cup with a minimum of turbulence to simulate the conditions where a carbonated beverage is poured from the bottle to a cup.

In certain prior art devices the pressure maintained on the pre-mix in the metering chamber has been developed by a piston in a cylinder with the piston coupled to a dash pot to restain its movement to permit the pre-mix to enter the metering chamber under back pressure. In another known apparatus the metering chamber is pre-pressurized with a gas before the pre-mix is allowed to enter the metering chamber. In another known apparatus the piston in the metering chamber is opposed by a gas pressure to apply a back pressure on the entering pre-mix.

These prior art devices require a large number of expensive and complicated parts and in some air is drawn into the metering chamber with resulting unsanitary conditions. In others complicated structure is required to automatically refill the metering chamber at the completion of a dispensing operation.

The apparatus of the present invention overcomes the disadvantages of the prior art while providing a positive displacement metering device which measures very accurately the proper amount of pre-mix to be dispensed during each cycle of operation and at the same time dispenses the pre-mix into the cup without undue separation of the carbon dioxide gas from the pre-mix, as by foaming, which would cause the cup to run over.

Further, the novel apparatus of the present invention requires no auxiliary equipment such as a timer, anti-jackpot solenoid valve, flow controls, and the like, and is therefore a very economical system both to manufacture and to maintain for dispensing pre-mix.

The novel apparatus of the present invention also provides a more sanitary positvie displacement metering apparatus in which the metering chamber is closed to the atmosphere at all times except during actual vending and, during actual vending of the pre-mix, the atmosphere is excluded from the metering chamber by the outward flow of the pre-mix.

In the present apparatus the pre-mix in the metering chamber is under pressure to keep the carbon dioxide gas in solution except during the discharge portion of the dispensing cycle.

The novel apparatus of the present concept automatically refills the metering chamber immediately after completion of the discharge portion of the dispensing cycle.

These and other objects of the present invention are obtained by the novel apparatus to be hereinafter described it being understood that the novel concept of the present invention is capable of various mechanical embodiments one of which is disclosed in the accompanying drawings and is described hereinafter to illustrate the invention.

This illustrative embodiment of the present invention should in no way be construed as defining or limiting the same and reference should be had to the appended claims to determine the scope of this invention.

In the accompanying drawings, in which like reference characters indicate like parts, Fig. 1 is a view partly in section of an illustrative embodiment of the present invention including a diagrammatic showing of a suitable electric circuit for operating the same;

Fig. 2 is a view, partly in section, of a portion of the embodiment of Fig. 1 showing in further detail the valve construction employed;

Figure 3:
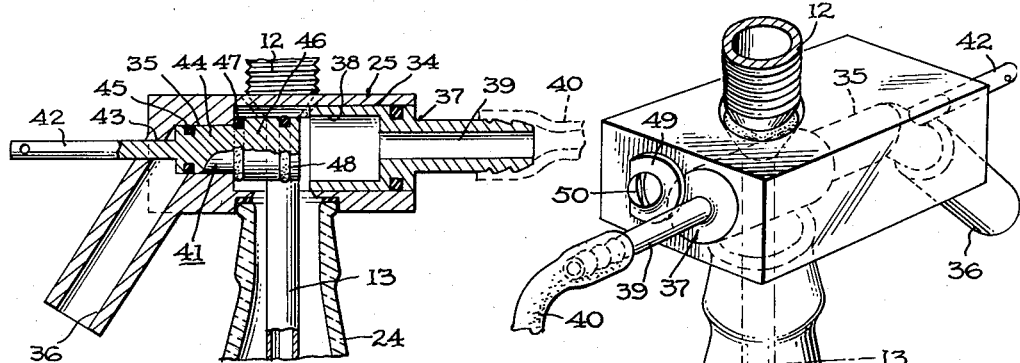
Fig. 3 is a cross sectional view through the valve of Fig. 1 showing the valve in position closing the dispensing opening.

Referring now more particularly to Fig. 1, the novel dispensing apparatus of the present invention includes a reservoir 10 for electrolyte which communicates with a metallic tube 11, tube 11 being provided with threaded portion 12 and an extended portion 13 of reduced diameter. A conical surface 14 is provided between tube 11 and extension 13.

A suitable electrical contact 15 is mounted within reservoir 10 and tube 11 is provided with a metallic tab 16 providing the second electrical contact of the electrical operating circuit for the apparatus which will be described in more detail hereinafter.

A suitable check valve generally indicated at 17 is mounted at the lower end of extension 13 and is of any suitable construction to permit free downward flow of electrolyte from reservoir 10 through tube 11 and extension 13 while restricting the upward flow of electrolyte in tube 13 for reasons which will appear more fully hereinafter. Check valve 17 is seen to comprise a body portion 18 mounted for movement within extension 13 and having an axial bore 19 which passes through head 20 which, in raised position, closes the lower end of extension 13. Extension 13 may also be provided with a plurality of openings 21 which are covered by body member 18 when in raised position but which are opened when check valve 17 is in its lower position.

An expansible and contractible bladder of any suitable material which will not contaminate the pre-mix or be attacked by the electrolyte is indicated at 22 and the upper end of the same is slipped over and secured to extension 13 as at 23. Bladder 22 is contained within metering chamber 24. The upper open end of chamber 24 is closed by valve block 25.

Valve block 25 is provided with bore 26 through which extension 13 passes and bore 26 is provided with a conical opening 27 receiving the open upper end of chamber 24. A suitable gasket 28 is provided to insure a fluid tight seal therebetween. Bore 26 is provided with a second conical opening 29 which receives conical surface 14 and a second gasket 30 is provided to insure a fluid tight seal therebetween. A suitable frame 31 passes around chamber 24 and around valve block 25 with tube 11 passing therethrough at 32. A nut 33 is mounted on threads 12 beneath the top of frame 31 and rotation of the same in the proper direction forces tube 13 downwardly so that surface 14 presses against gasket 30 and seats valve block 25 firmly on the top of chamber 24.

Referring now more particularly to Figs. 3-6, valve block 25 is provided with an axial bore 34 offset from bore 26 but opening into bore 26. Bore 34 is provided with an extension bore 35 of reduced diameter which opens into dispensing spout 36. Bore 34 is closed by metallic member 37 provided with valve chamber 38 which communicates with tubular extension 39 which, in turn, is connected to any suitable source of pre-mix under pressure through conduit or hose 40.

Figure 6:
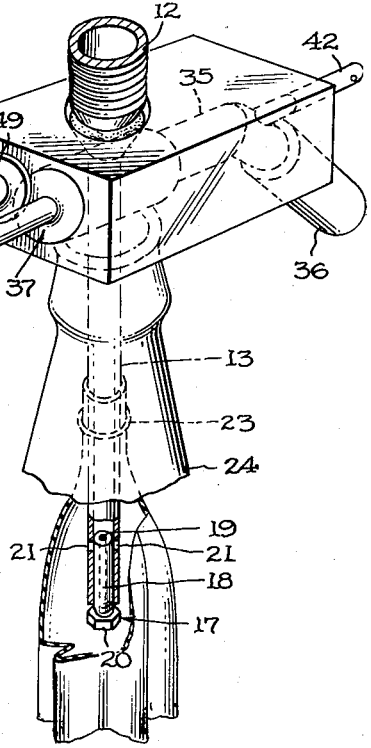
Fig. 6 is an enlarged showing of the valve construction and of the check valve.

A valve member generally indicated at 41 is mounted for reciprocating movement within bore 34, extension bore 35 and valve chamber 38 and is actuated by rod 42 which passes through extension 43 of bore 35. Valve member 41 is of suitable diameter in its portion 44 to form a close fit in bore 35 and a suitable ring type gasket 45 is provided to form a fluid tight fit therewith. Valve member 41 is provided with portion 46 of the same diameter as valve chamber 38 to form a close fit therewith and portion 46 is provided with spaced ring gaskets 47 and 48 to form a fluid tight seal between portion 46 and chamber 38. As seen in Fig. 6, metallic member 37 is held in bore 34 by any suitable means as by eccentric disc 49 and set screw 50.

Valve member 41 is reciprocated through rod 42 by rod 51 pivoted at 52 and connected at 53 to core 54 of a suitable solenoid 55. When solenoid 55 is energized core 54 is drawn to the left as seen in Fig. 1 and rod 42 is moved to the right moving valve member 41 to the right to first close valve chamber 38 and thereafter to open bore 35 and dispensing spout 36. When solenoid 55 is deenergized core 54 moves to the right in conventional manner by any suitable means such as springs and rod 42 is moved to the left first closing bore 35 and then opening valve chamber 38.

A suitable electric circuit for energizing solenoid 55 is seen in Fig. 1 and includes wires 56 and 57 connecting to any suitable source of electrical energy. Wire 57 connects directly to one side of solenoid 55 and wire 56 connects to electrical contact 15 mounted within reservoir 10. The other side of solenoid 55 is connected by wire 58 to one side of relay switch 59 which is normally open. One side of second relay switch 60 is connected by wire 61 to tab 16 and switch 60 is normally open. A wire 62 connects to wire 56 and to one side of coin actuated switch 63. The other side of coin actuated switch 63 is connected by wire 64 to relay coil 65, the other side of which is connected by wire 66 to wire 57. Wire 67 connects relay switch 59 to wire 62 and wire 68 connects relay switch 60 to wire 64.

Assuming that pre-mix under pressure has been supplied through conduit 40 to metering chamber 24; that bladder 22 is collapsed; that electrolyte 69 in reservoir 10, tube 11, extension 13, and bladder 22 is at level 70 in reservoir 10; and that solenoid 55 and valve 41 are in the positions shown in Fig. 1 with dispensing spout 36 closed. When a coin is inserted in the dispensing apparatus in known manner switch 63 is closed momentarily energizing coil 65. Switches 59 and 60 are closed by coil 65. Switch 63 opens immediately and coil 65 is then energized through the circuit including wire 57, wire 66, wire 68, switch 60, wire 61, tab 16, tube 11, electrolyte 69, contact 15 and wire 56.

Figure 4:
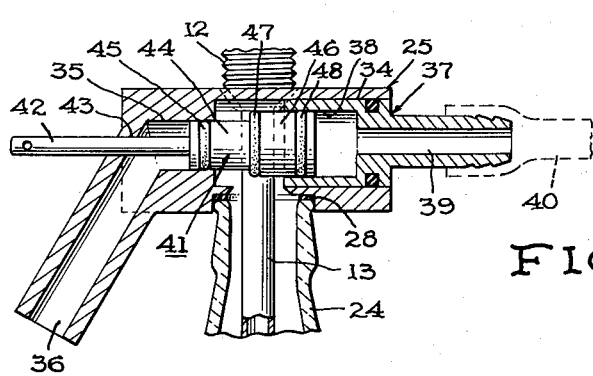
Fig. 4 is a view similar to that of Fig. 3 showing the valve in intermediate position closing both the dispensing opening and the opening from the source of pre-mix under pressure.
Figure 5:
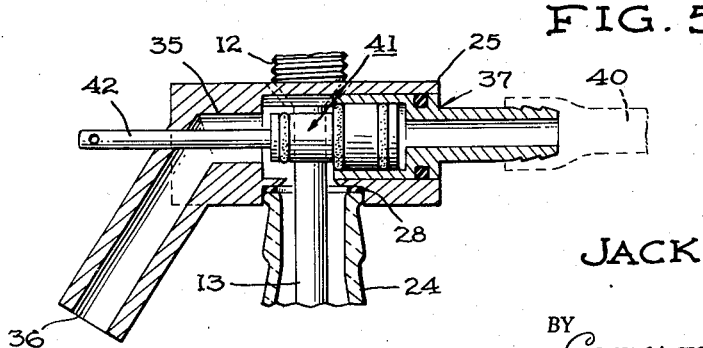
Fig. 5 is a view similar to Fig. 3 showing the valve in position opening the dispensing opening while closing the opening from the source of supply of pre-mix.

Solenoid 55 is then energized through the circuits including switch 59 and core 54 moves to the left moving rod 42 to the right and valve member 41 is moved to the right as seen in Figs. 3-5. As valve member 41 moves to the right portion 46 thereof first closes valve chamber 38 closing off the source of supply of pre-mix under pressure and in so doing enlarges the volume of metering chamber 24 releasing some of the pressure on the pre-mix therein. Further movement of valve member 41 to the right brings it to the position seen in Fig. 5 where portion 44 has cleared bore 35 opening dispensing spout 36. Pressure on the pre-mix in chamber 24 is released and electrolyte 69 will then flow downward under the force of gravity freely through check valve 17 into bladder 22 expanding the same and forcing the pre-mix out of dispensing spout 36 with minimum foaming.

Electrolyte 69 will continue to fill bladder 22 until its level 70 drops below the lower end of contact 15. At this point the holding circuit for coil 65 will be broken, switches 59 and 60 will open, and solenoid 55 will be deenergized. Core 54 will then move to the right and rod 42 will move to the left reversing the above described action of valve member 41. During the first part of the movement of valve member 41 to the left, bore 35 is closed, closing dispensing spout 36 before valve portion 46 leaves valve chamber 38. As the valve member moves further to the left, moreover, it decreases the volume of the metering chamber and builds up pressure which closes the check valve 17. Thereafter, further movement of valve member 41 to the left withdraws portion 46 from chamber 38 opening chamber 24 to pre-mix under pressure from the source thereof.

The pre-mix under pressure then enters chamber 24 and, being under pressure, will act to collapse bladder 22 and force the electrolyte 69 therein upwardly through extension 13 and tube 11 into reservoir 10. Pressure must be maintained on the pre-mix to prevent it from foaming and check valve 17 is provided for this purpose. As already explained, the check valve is closed and pressure builds up in the metering chamber before the incoming pre-mix enters the chamber, the electrolyte moving upwardly under the collapsing action of bladder 22 only through the restricted opening provided by central bore 19. Thus even at the instant of opening of the chamber 38 into the chamber 24, there is no temporary low pressure condition to cause foaming and the entering pre-mix is maintained under the required back pressure to prevent foaming.

Pre-mix under pressure will continue to enter chamber 24 until the bladder 22 is collapsed and the electrolyte has regained its initial level 70 in reservoir 10. As soon as the electrolyte 69 engages contact 15 the electrical circuit of the apparatus is again ready for the vend cycle.

From the above it should be obvious that the amount of electrolyte 69 contained in reservoir 10 and the position of contact 15 determines the volume of pre-mix dispensed. The volume of pre-mix dispensed can therefore be determined with great accuracy. Prevention of foaming in chamber 24 by the choke action of check valve 17, as above described, insures that chamber 24 will be filled with pre-mix to be dispensed and the increase in volume of chamber 24 by the action of valve 41, as above described, immediately before dispensing spout 36 is opened relieves the pressure on the pre-mix in chamber 24 so that the same is dispensed with minimum spurting and foaming.

It should now be apparent that the present apparatus in every way satisfies the several objectives described above.

Changes in or modifications to the above described illustrative embodiment of this apparatus may now be suggested to those skilled in the art without departing from the present inventive concept. Reference should therefore be had to the appended claims to determine the scope of this invention.

What is claimed is:

1. In apparatus for dispensing pre-mix carbonated beverages, a chamber holding the beverage to be dispensed, a valve body, a bore in said body having a portion of larger diameter and a communicating portion of reduced diameter, said portion of larger diameter being in communication with said chamber, a discharge port opening into said portion of smaller diameter, a unitary valve member mounted for reciprocation in said bore comprising a piston element having a fluid tight fit in said portion of reduced diameter and a piston element having a fluid tight fit in said portion of larger diameter, means for reciprocating said piston elements in said bore in unison, said piston elements being so constructed and arranged that both portions of said bore are closed for a predetermined distance of travel of said valve member after one of said portions is closed and before the other of said portions is opened, and means for placing said portion of larger diameter in communication with a source of pre-mix carbonated beverage under pressure.

2. In apparatus for dispensing pre-mix carbonated beverages, a chamber, means dividing said chamber into two expansible and contractible parts, one a metering chamber and the other a liquid containing chamber, a three-way valve in communication with said metering chamber, a source of pre-mix carbonated beverage under pressure connected to said valve, a discharge port for said valve, a piston in said valve normally opening said metering chamber to said source of beverage and movable for dispensing to first close said metering chamber off from said source and then open said metering chamber to said discharge port, an elevated reservoir containing liquid and communicating with said liquid chamber, and check valve means permitting free flow of liquid from said reservoir to said liquid chamber and retarding flow of liquid from said liquid chamber to said reservoir.

3. Dispensing apparatus as described in claim 2 including electric means for actuating said piston when a predetermined volume of liquid has left said reservoir first closing said discharge port and then opening said metering chamber to said source of carbonated beverage.

4. Dispensing apparatus as described in claim 3, said electric means for actuating said valve including a solenoid, a core actuated by said solenoid connected to said piston, an electric circuit for said solenoid, normally open switch means in said circuit and means opening said circuit when a predetermined volume of liquid has left said reservoir.

5. In apparatus for dispensing pre-mix carbonated beverage, an elevated reservoir, a metering chamber, an expansible and collapsible bladder in said chamber, conduit means connecting said reservoir and said bladder, a three-way valve connected to said metering chamber, an outlet for said valve, means for connecting said valve to a source of pre-mix carbonated beverage under pressure, a piston in said valve, solenoid means for actuating said piston, an electric circuit for said solenoid, means for opening said circuit responsive to the level of liquid in said reservoir, said piston upon actuation first closing off said source of beverage under pressure and then opening said chamber to said outlet, and check valve means in said conduit means permitting free flow of liquid to said bladder and retarding flow of liquid from said bladder to said reservoir.

References Cited in the file of this patent

UNITED STATES PATENTS

| | | |
|---|---|---|
| 1,219,800 | Bonnefon | Mar. 20, 1917 |
| 2,472,389 | Von Stoeser | June 7, 1949 |
| 2,662,541 | Noon | Dec. 15, 1953 |
| 2,793,793 | Sampson | May 28, 1957 |
| 2,805,004 | Burns et al. | Sept. 3, 1957 |
| 2,807,393 | Matrailer et al. | Sept. 24, 1957 |